United States Patent
Minematsu (10) Patent No.: US 8,577,032 B2
(45) Date of Patent: Nov. 5, 2013

(54) COMMON KEY BLOCK ENCRYPTION DEVICE, COMMON KEY BLOCK ENCRYPTION METHOD, AND PROGRAM

(75) Inventor: Kazuhiko Minematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 468 days.

(21) Appl. No.: 12/672,346

(22) PCT Filed: Aug. 1, 2008

(86) PCT No.: PCT/JP2008/063847
§ 371 (c)(1),
(2), (4) Date: Feb. 5, 2010

(87) PCT Pub. No.: WO2009/020060
PCT Pub. Date: Feb. 12, 2009

(65) Prior Publication Data
US 2011/0211691 A1    Sep. 1, 2011

(30) Foreign Application Priority Data
Aug. 6, 2007  (JP) ................. 2007-204132

(51) Int. Cl.
*H04L 9/00*    (2006.01)
(52) U.S. Cl.
USPC ............ 380/46; 380/26; 380/29; 380/30; 380/44; 380/47
(58) Field of Classification Search
USPC ............ 380/28, 29, 30, 27, 46, 44, 47
See application file for complete search history.

(56) References Cited

U.S. PATENT DOCUMENTS

| | | | |
|---|---|---|---|
| 5,949,884 A * | 9/1999 | Adams et al. | 380/29 |
| 6,104,811 A | 8/2000 | Aiello et al. | |
| 7,227,951 B2 | 6/2007 | Desai et al. | |

(Continued)

FOREIGN PATENT DOCUMENTS

| JP | 2000-502822 | 3/2000 |
|---|---|---|
| JP | 2001-324925 | 11/2001 |

(Continued)

OTHER PUBLICATIONS

International Search Report—PCT/JP2008/063847—Aug. 26, 2008.

(Continued)

*Primary Examiner* — Edward Zee
*Assistant Examiner* — Baotran N To
(74) *Attorney, Agent, or Firm* — Young & Thompson (57) ABSTRACT

A common key block encryption device includes a first hash unit applying locked key permutation to a variable-length s-bit plaintext, and outputting a fixed-length n-bit first block and a second (s-n)-bit block; a first encryption processing unit outputting a third block encrypted by element of n-bit block tweakable block cipher using tweak, inputting the first block; a second encryption processing unit generating a random number (s-n)-bit block with a result of group computation of the third block and the first block as input by using an arbitrary cipher having theoretical security at least against a known-plaintext attack; and a second hash unit applying the locked key permutation to the result of the group computation of the random number block and the second block, and to the third block to output a fifth n-bit block and a sixth (s-n)-bit block. The fifth and sixth blocks are concatenated into an s-bit encryption.

21 Claims, 3 Drawing Sheets

(56) References Cited

U.S. PATENT DOCUMENTS

| | | | |
|---|---|---|---|
| 7,809,136 B2 | 10/2010 | Desai et al. | |
| 2001/0021253 A1 | 9/2001 | Furuya et al. | |
| 2004/0131182 A1* | 7/2004 | Rogaway | 380/37 |

FOREIGN PATENT DOCUMENTS

| | | |
|---|---|---|
| JP | 2003-195757 | 7/2003 |
| JP | 2007-86421 | 4/2007 |
| WO | 2006/064763 | 12/2005 |

OTHER PUBLICATIONS

William Aiello et al.—High- Speed Pseudorandom Number Generation with Small Memory, Fast Software Encryption, 6th International Workshop, FSE'99, Lecture Notes in Computer Science; vol. 1636, Mar. 1999.

Kazuhiko Minematsu et al.—Hybrid Symmetric Encryption Using Known-Plaintext Attack-Secure Components, pp. 242-260, Information Security and Cryptology-ICISC 2002, 5th International Conference Seoul, Korea, Nov. 28-29, 2002. Lecture Notes in Computer Science 2587 Springer 2003, ISBN 3-540-00716-4.

Deli Maurer et al.—From Known-Plaintext to Chosen-Ciphertext Security, Cryptology ePrint Archive 20061071, http:/leprint.iacr org12006/071.pdf.

Moses Liskov et al.—Tweakable Block Ciphers, Advances in Cryptology—CRYPTO'02, LNCS 2442, pp. 31-46, 2002.

Phillip Rogaway—Efficient Instantiations of Tweakable Blockciphers and Refinements to Modes OCB and PMAC, Advances in Cryptology—Asiacrypt'04. LNCS 3329, pp. 16-31, 2004.

Peng Wang et al.—HCTR: A Variable-Input-Length Enciphering Mode, pp. 175-188, Information Security and Cryptology, First SKLOIS Conference, Cisc 2005, Proceedings. Lecture Notes in Computer Science 3822 Springer 2005.

Debrup Chakraborty et al.—HCH: A New Tweakable Enciphering Scheme Using the Hash-Encrypt-Hash Approach, pp. 287-302, Progress in Cryptology—INDOCRYPT 2006, proceedings Lecture Notes in Computer Science 4329 Springer 2006.

Shai Halevi et al.—MMH: Software Message Authentication in the Gbit/second Rates, Fast Software Encryption, 4th International Workshop, FSE' 97, Lecture Notes in Computer Science: vol. 1267, Springer 1997 pp. 172-189.

Daniel J. Bernstein—The Poly1305-AES Message Authentication Code, Fast Software Encryption, FSE 2005, Lecture notes in computer science 3557, pp. 32-49, Springer, 2005.

Joan Daemen et al.—"AES Proposal: Rijndael", AESsubmission 1998.

Henri Gilbert, The Security of "One-Block-to-Many", Modes of Operation, FSe 2003, Lecture notes in computer science 2887, pp. 376-395, 2003.

Phillip Rogaway et al.—A Software-Optimized Encryption Algorithm, Fast Software Encryption, 1st International Workshop, FSE '93, Lecture Notes in Computer Science; vol. 809, Feb. 1993.

Alex Biryukov—A new 128-bit Key Stream Cipher LEX, ECRYPT eSTREAM project candidate. http://www.ecrypt.eu.org/stream/ciphers/lex/lex.pdf.

Japanese Office Action dated May 7, 2013 in corresponding Japanese Patent Application No. 2009-526432 with English translation of enclosed wavy lined portion.

Daniel J. Bernstein, "The Poly1305-AES Message-Authentication Code", LNCS, Security and Cryptography for Networks, Sep. 2008, vol. 5229, published by Springer, pp. 32-49.

* cited by examiner

COMMON KEY BLOCK ENCRYPTION DEVICE, COMMON KEY BLOCK ENCRYPTION METHOD, AND PROGRAM

FIELD OF THE INVENTION

Reference to Related Application

The present invention is based upon and claims the benefit of the priority of Japanese patent applications No. 2007-204132 filed on Aug. 6, 2007, the disclosure of which is incorporated herein in its entirety by reference thereto.

The present invention relates to a common key block encryption device, common key block encryption method, and program, and particularly to a common key block encryption device, common key block encryption method, and program suitable for disk sector encryption, the standardization of which is considered by the Security in Storage Working Group of the IEEE.

BACKGROUND OF THE INVENTION

There are many known approaches in which a new cipher is composed using a block cipher and hash function etc. as components. For instance, in encryption of storage devices such as a hard disk, research on composing a block cipher having a larger block size (such as 512 bits) corresponding to the size of the sector as a target block size using a block cipher having a standard block size (such as 128 bits) has been performed in order to facilitate the processing of encrypted data on a sector-by-sector basis.

Normally, security against a chosen-plaintext attack on a component is required in order to secure the sufficient security of a completed cipher in such a combination of encryption components. The "sufficient security" means security against any chosen-plaintext attack, or any attack arbitrarily combining a chosen-plaintext attack and chosen-ciphertext attack (simply called "chosen-ciphertext attack" hereinafter) when the target is a block cipher, and security against any chosen-plaintext attack based on a model in which the attacker can select an initial vector (abbreviated as "IV" hereinafter) when the target is a stream cipher.

In a cipher composed so as to theoretically guarantee security by using only secure components against any chosen-plaintext attack (PA) or chosen-ciphertext attack (CCA), its throughput (the processing amount per unit time) cannot exceed the throughput of the components. On the other hand, Non-Patent Document 1 [BIB-ARV] describes an approach that combines components meeting the standards of security with a weak definition, rather than use only secure components against any chosen-plaintext/ciphertext attack.

Non-Patent Document 1 [BIB-ARV] proposes an idea that achieves high security and high-speed operation by combining a relatively slow encryption process having high security and a high-speed encryption process having relatively weak security. More concretely, Non-Patent Document 1 [BIB-ARV] proposes to construct an additive stream cipher with an IV by expanding the output of a block cipher having the IV as input with another deterministic function func. The document indicates that, when the block cipher is secure against any chosen-plaintext attack and func is a secure pseudorandom generator, the constructed additive stream cipher with the IV is also secure against any chosen-IV attack in this case.

Here, the pseudorandom generator means a function in which, when the input is unknown uniform random numbers in a random input, it is difficult to quantitatively distinguish its output from the uniform random numbers, and security against chosen-plaintext attacks that judge the randomness of the output while adaptively selecting an input is not required.

Therefore, the pseudorandom generator is expected to operate faster than a component secure against chosen-plaintext attacks. As a matter of fact, the approach described in Non-Patent Document 1 [BIB-ARV] asymptotically makes the throughput of the target additive stream cipher with the IV the same as the throughput of the function func.

The goal of Non-Patent Document 1 [BIB-ARV] is to construct a stream cipher, however, a similar approach to block cipher is described in Non-Patent Document 2 [BIB-HYB]. More concretely, Non-Patent Document 2 describes a technique in which a block cipher with an arbitrary, large block size is composed by combining a block cipher secure against a combination of a chosen-plaintext attack and chosen-ciphertext attack (called "chosen-ciphertext attack" hereinafter) and a cipher (not always a block cipher) secure against any known-plaintext attack.

Further, Non-Patent Document 2 [BIB-HYB] describes a method (PRP; Pseudo-Random Permutation) in which a final composed cipher is only secure against chosen-plaintext attacks, and a method (SPRP; Strong Pseudo-Random Permutation) in which a final composed cipher is secure against chosen-ciphertext attacks. Below, we will consider a case in which the latter method (SPRP) is implemented using block cipher E of an n-bit block secure against any chosen-ciphertext attack, and cipher F with n-bit input and variable-length of output secure against any known-plaintext attack.

First, it is known that the cipher F can be realized by having a cipher with n-bit input/output secure against any known-plaintext attack operate in ICT (Increasing Chain Tree) mode described in Non-Patent Document 3 [BIB-ICT]. Therefore, in the case where a block cipher of an nm-bit block size secure against any chosen-ciphertext attack is composed using the method of Non-Patent Document 2 [BIB-HYB], an (m−2)n-bit output is obtained by calling the cipher E twice and the cipher F once.

Since a known-plaintext attack is weaker than a chosen-ciphertext attack, the cipher F is expected to be faster than the cipher E in terms of calculation amount per output block. Therefore, the throughput in the method of Non-Patent Document 2 [BIB-HYB] asymptotically coincides with the throughput of the cipher F.

The block cipher having a large block size secure against chosen-ciphertext attacks, which is realized by Non-Patent Document 2 [BIB-HYB], is effective for encrypting computer files, however, an additional parameter called "tweak" to the block cipher is sometimes required for general storage encryption.

The tweak is effective when storage is divided into a plurality of individual regions. For instance, in hard disk encryption, a disk is divided by a unit of (usually) 512 bytes called sector, and when they are encrypted, encryption is performed on a sector-by-sector basis. However, it is not preferable to encrypt every sector using the same key because the fact that the same information exists in different sectors will be leaked. Therefore, having the sector number as the tweak, encryption is performed so that the same plaintexts having different tweaks will be entirely different ciphertexts.

A parameter having such a property have been conventionally incorporated into several block ciphers, and Non-Patent Document 4 [BIB-LRW] theoretically formulates it. Further, a technique that composes an n-bit tweakable block cipher from a general n-bit block cipher without any tweak is described in Non-Patent Document 5 [BIB-XEX] in addition to Non-Patent Document 4 [BIB-LRW]. Here, when a block cipher with a tweak meets the security requirements defined by Non-Patent Document 5 [BIB-LRW], the block cipher is deemed "tweakable."

Methods, described in Non-Patent Documents 6 [BIB-HCTR] and 7 [BIB-HCH], that compose a tweakable s-bit block cipher for an integer s equal to or greater than n using only an n-bit block cipher are known. These methods use a block cipher secure against any chosen-ciphertext attack as a black box, and their security against chosen-ciphertext attacks depends on the security of the used block cipher against chosen-ciphertext attacks.

Further, Non-Patent Document 8 [BIB-MMH] describes a method that realizes an AXU (Almost-XOR-Universal) hash function using a multi-modular hash function.

Non-Patent Document 9 [BIB-POLY] describes an algorithm that computes a product over a finite field at high speed.

Non-Patent Document 10 [BIB-AES] describes an example of a block cipher secure against any chosen-ciphertext attack.

Non-Patent Document 11 [BIB-GIL] describes the modified counter mode of a block cipher.

Non-Patent Document 12 [BIB-SEAL] describes a stream cipher SEAL. Non-Patent Document 13 [BIB-LEX] describes a stream cipher LEX based on AES of Non-Patent Document 10 [BIB-AES].

[Non-Patent Document 1]
[BIB-ARV]
W. Aiello, S. Rajagopalan, and R. Venkatesan, "High-Speed Pseudorandom Number Generation with Small Memory," Fast Software Encryption, 6$^{th}$ International Workshop, FSE '99, Lecture Notes in Computer Science; Vol. 1636, March 1999

[Non-Patent Document 2]
[BIB-HYB]
K. Minematsu and Y. Ysunoo, "Hybrid Symmetric Encryption Using Known-Plaintext Attack-Secure Components," pp. 242-260, Information Security and Cryptology-ICISC, 2002, 5th International Conference, Seoul, Korea, Nov. 28-29, 2002, Lecture Notes in Computer Science 2587, Springer, 2003, ISBN 3-540-00716-4

[Non-Patent Document 3]
[BIB-ICT]
U. Maurer and J. Sjoedin, "From Known-Plaintext to Chosen-Ciphertext Security," Cryptology ePrint Archive 2006/071, http://eprint.iacr.org/2006/071.pdf

[Non-Patent Document 4]
[BIB-LRW]
M. Liskov, R. Rivest, and D. Wagner, "Tweakable Block Ciphers," Advances in Cryptology-CRYPTO '02, LNCS 2442, pp. 31-46, 2002.

[Non-Patent Document 5]
[BIB-XEX]
P. Rogaway, "Efficient Instantiations of Tweakable Blockciphers and Refinements to Modes OCB and PMAC," Advances in Cryptology-ASIACRYPT '04, LNCS 3329, pp. 16-31, 2004.

[Non-Patent Document 6]
[BIB-HCTR]
P. Wang, D. Feng, and W. Wu, "HCTR: A Variable-Input-Length of Enciphering Mode," pp. 175-188, Information Security and Cryptology, First SKLOIS Conference, CISC 2005, Proceedings, Lecture Notes in Computer Science 3822, Springer, 2005.

[Non-Patent Document 7]
[BIB-HCH]
D. Chakraborty and P. Sarkar, "HCH: A New Tweakable Enciphering Scheme Using the Hash-Encrypt-Hash Approach," pp. 287-302, Progress in Cryptology-INDOCRYPT 2006, Proceedings, Lecture Notes in Computer Science 4329, Springer, 2006.

[Non-Patent Document 8]
[BIB-MMH]
S. Halevi and H. Krawczyk, "MMH: Software Message Authentication in the Gbit/second Rates," Fast Software Cipher, 4$^{th}$ International Workshop, FSE '97, Lecture Notes in Computer Science; Vol. 1267, Springer, 1997, pp. 172-189

[Non-Patent Document 9]
[BIB-POLY]
D. J. Bernstein, "The Poly1305-AES Message Authentication Code," Fast Software Encryption, FSE 2005, Lecture Notes in Computer Science 3557, pp. 32-49, Springer, 2005.

[Non-Patent Document 10]
[BIB-AES]
J. Daemen and V. Rijmen, "AES Proposal: Rijndael," AES submission, 1998.

[Non-Patent Document 11]
[BIB-GIL]
H. Gilbert, "The Security of "One-Block-to-Many" Modes of Operation," FSE 2003, Lecture Notes in Computer Science 2887, pp. 376-395, 2003.

[Non-Patent Document 12]
[BIB-SEAL]
P. Rogaway and D. Coppersmith, "A Software-Optimized Encryption Algorithm," Fast Software Encryption, 1$^{st}$ International Workshop, FSE '93, Lecture Notes in Computer Science; Vol. 809, February 1993.

[Non-Patent Document 13]
[BIB-LEX]
A. Biryukov, "A New 128-bit Key Stream Cipher: LEX," ECRYPT eStream project candidate, http://www.ecrypt.eu.org/stream/ciphers/lex/lex.pdf

SUMMARY OF THE INVENTION

Problems to be Solved by the Invention

The entire disclosures of the above-mentioned Non-Patent Documents 1 to 13 are incorporated herein by reference thereto. An analysis by the present invention will be given below.

By using SPRP described in Non-Patent Document 2 [BIB-HYB], a block cipher with a large block size secure against any chosen-ciphertext attack can be composed, however, the document does not mention the tweak, and a tweakable cipher cannot be composed.

Further, in SPRP of Non-Patent Document 2 [BIB-HYB], the number of calls to the cipher E is two when one block is encrypted. Particularly, when the block size is comparatively small, the number of calls to the cipher E relatively increases and this may hinder the speed improvement.

The present invention has been achieved considering the above problem, and it is an object of the present invention to provide a common key block encryption device, common key block encryption method, and program capable of reducing the number of calls to n-bit block cipher E secure against any chosen-ciphertext attack and of generating a tweakable cipher secure against any chosen-ciphertext attack, using the cipher E, an n-bit input being secure against any known-plaintext attack, and cipher F having a variable length of output.

Means to Solve the Problems

According to a first aspect of the present invention, a common key block encryption device that receives a plaintext of a variable-length of s bit as input, performs the processing described below, and outputs an s-bit cipher is provided. First hash means applies locked key permutation to a plaintext of the variable-length of s bit, and outputs a first block of a fixed-length of n bit and a second block of (s-n) bit. First encryption processing means outputs a third block encrypted by means of n-bit block tweakable block cipher using tweak, receiving the first block as input. Second encryption processing means generates a random number block of (s-n) bit with a result of group computation of the third block and the first block as input by using an arbitrary cipher having theoretical security at least against a known-plaintext attack. Second hash means applies the locked key permutation to the result of the group computation of the random number block and the second block, and to the third block to output a fifth block of n bit and a sixth block of (s-n) bit. Finally, the fifth and sixth blocks are concatenated, and an s-bit cipher is outputted.

According to a second aspect of the present invention, there is provided a common key block encryption method that encrypts data and writes the result to storage by performing the processing below. First, a computer connected to the storage applies locked key permutation to a plaintext of a variable-length of s bit, and outputs a first block of a fixed-length of n bit and a second block of an (s-n) bit. Next, the computer outputs a third block encrypted by means of n-bit block tweakable block cipher using tweak, receiving the first block as input. Then, the computer generates a random number block of (s-n) bit, receiving the result of group computation of the third block and the first block as input by using an arbitrary cipher having theoretical security at least against a known-plaintext attack. Further, the computer applies locked key permutation to the result of the group computation of the random number block and the second block, and to the third block, and outputs a fifth block of n bit and a sixth block of (s-n) bit. Finally, the computer concatenates the fifth and sixth blocks and writes an s-bit ciphertext to the storage.

According to a third aspect of the present invention, there is provided a program that has a computer encrypt data and write the result to storage by having the computer execute the processing described below. First, a first encryption processing of encrypting by means of n-bit block tweakable block cipher using tweak, receiving a first block of an n bit obtained from a bit sequence obtained by applying locked key s-bit permutation to a plaintext of an s bit as input is executed. Next, a processing of applying locked key permutation to a plaintext of a variable-length of s bit, and outputting a first block of a fixed-length of n bit and a second block of (s-n) bit is executed. Then, a processing of outputting a third block encrypted by means of n-bit block tweakable block cipher using tweak, receiving the first block as input is executed. Further, a processing of generating a random number block of (s-n) bit with result of group computation of the third block and the first block as input by using an arbitrary cipher having theoretical security at least against a known-plaintext attack is executed. Next, a processing of applying the locked key permutation to the result of the group computation of the random number block and the second block, and to the third block, and outputting a fifth block of n bit and a sixth block of (s-n) bit is executed. Finally, a processing of concatenating the fifth and sixth blocks, and writing an s-bit cipher to the storage is executed.

Effect of the Invention

According to the present invention, a cipher more efficient than the block cipher described in Non-Patent Document 2 [BIB-HYB] can be realized. The reason is that the number of calls to cipher E disregarding the preprocessing is always one regardless of the target block size. When the block size is sufficiently large, the difference that a call to E makes is rather small, however, the target block size is relatively small in storage encryption. Further, since the required security level is higher for the cipher E than for cipher F, the cipher E requires significantly more processing time than the cipher F. Therefore, the difference in the number of calls to E contributes to the efficiency.

Further, according to the present invention, a tweakable block cipher can be composed for an arbitrary block size equal to or larger than n. The present invention satisfies technical requirements demanded for disk sector encryption in this respect and is superior to Non-Patent Document 2 [BIB-HYB] in terms of versatility.

EXPLANATIONS OF SYMBOLS

101: plaintext input means
102: first hash means
103: unit block tweakable encryption means (first encryption processing means)
104, 104a: pseudorandom number generating means (second encryption processing means)
105: second hash means
106: ciphertext output means

PREFERRED MODES FOR CARRYING OUT THE INVENTION

Next, preferred modes of the present invention will be described in detail with reference to the drawings. In the explanations of the modes of the present invention below, the target block size is s (where s is an integer equal to or greater than n). Further, PA, XA, YA, and CA blocks are n bit, and PB, XB, YB, and CB blocks are (s-n) bit.

Exemplary Embodiment 1

Figure 1:
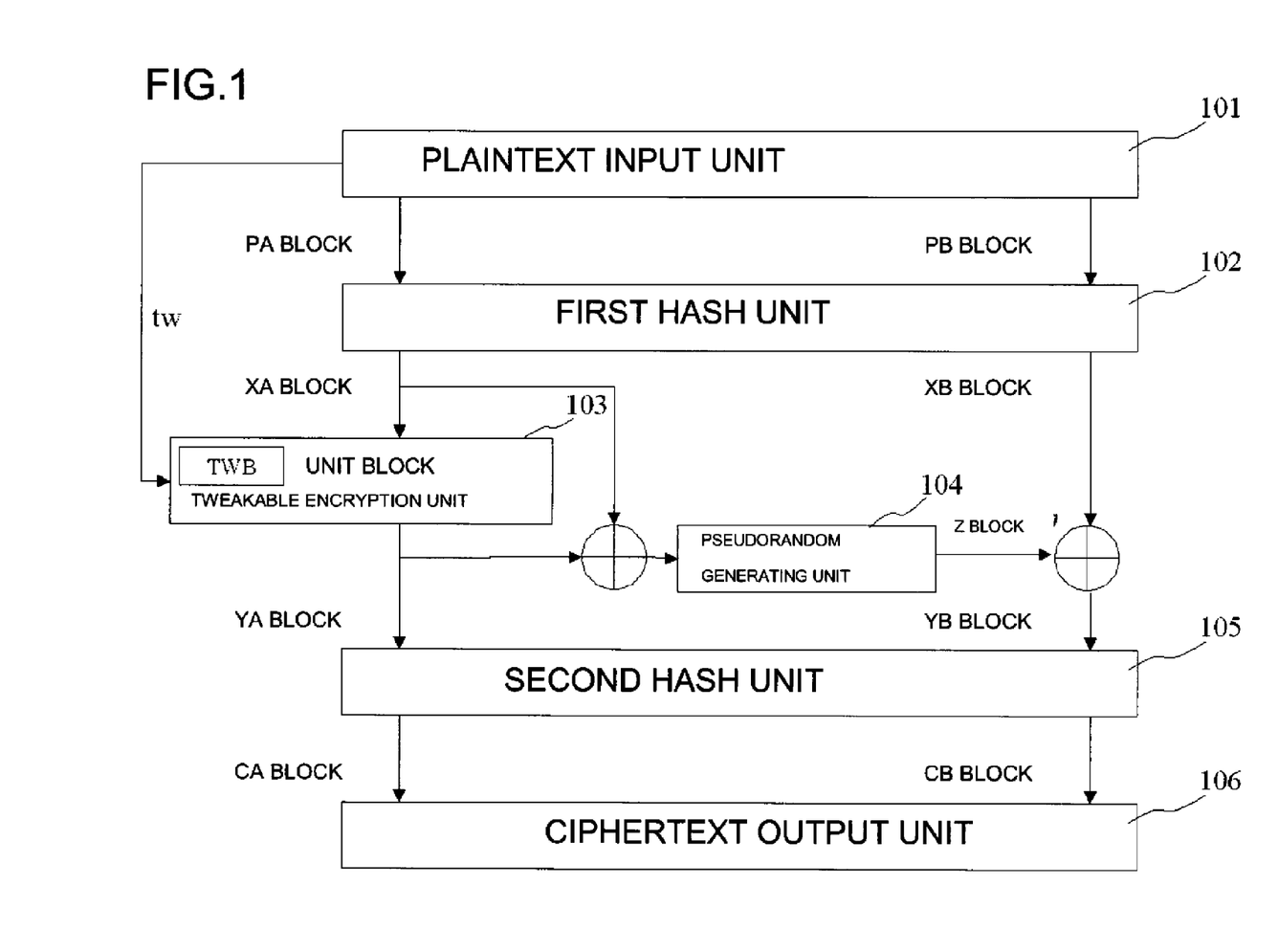
FIG. 1 is a block diagram showing the configuration of a common key block encryption device relating to a first exemplary embodiment of the present invention.

FIG. 1 is a block diagram showing the configuration of a common key block encryption device relating to a first exemplary embodiment of the present invention. In FIG. 1, the common key block encryption device relating to the first exemplary embodiment of the present invention includes plaintext input means 101, first hash means 102, unit block tweakable encryption means 103, pseudorandom number generating means 104, second hash means 105, and ciphertext output means 106. Among these, each of the first hash means 102, the unit block tweakable encryption means 103, pseudorandom number generating means 104, and the second hash means 105, and group processing shown in FIG. 1 are realized by a program that has a computer function as each of the above-mentioned means.

The plaintext input means 101 inputs a tweak value tw and an s-bit plaintext (the PA block and the PB block), an encryption target. The plaintext input means 101 is realized by, for instance, a character input device such as a keyboard. When the generated cipher dose not have to be tweakable, the tweak value is not required and may be a fixed value.

The first hash means 102 divides the s-bit plaintext inputted by the a plaintext input means 101 into a PA block and a PB block and generates an n-bit XA block (a first block) and an (s-n)-bit XB block (a second block). At this time, the first hash means 102 applies locked key s-bit permutation to two different s-bit plaintexts so that the probability of having a conflict in the respective XA block is very small.

Calling a function that takes out the first n bits (on the left side) of the inputted s-bit plaintext "left" and a function that takes out the remaining (s-n) bits (on the right side) "right," when the first hash means 102 is expressed by G1, G1 is locked key s-bit permutation. When an output for an input x is G1 [KH](x) (where KH is the key of G1), the probability that "left(G1 [KH](x))=left(G1 [KH](x'))" holds for two arbitrary different inputs x and x' needs to be small.

The first hash means 102 can be realized by, for instance, Feistel-type permutation using an AXU hash function. The AXU function is a locked key function in which the sum of outputs from different inputs are uniformly distributed, and is a type of so-called "universal hash function." The AXU hash function can be realized by using, for instance, a product over a finite field or the multi-modular hash function described in Non-Patent Document 8 [BIB-MMH].

The AXU hash function and the Feistel-type permutation using this function described in the above-mentioned Non-Patent Document 8 are incorporated herein by reference thereto.

More concretely, when an AXU hash function with an (s-n) bit input and n-bit output is called HE the output of the first hash means 102 from an input x is expressed by the following Expression 1. Further, "left (x)" in Expression 1 corresponds to the PA block, "right (x)" to the PB block and the XB block, and left "(x)+H1 (right (x))" to the XA block. Further, the + symbol in Expression 1 denotes the bitwise exclusive logical sum (exclusive OR).

$$G1[KH](x)=(\text{left}(x)+H1[KH](\text{right}(x)),\text{right}(x)) \quad [\text{EXPRESSION 1}]$$

In Expression 1, H1 only need to be a hash function, however, it may be realized by a simple algebraic algorithm. When s=nm (where m is an integer) and for instance "right (x)" is expressed as right (x)=($r\_1, \ldots, r\_\{m-1\}$) using n-bit vectors $r\_1, \ldots, r\_\{m-1\}$, H1 is assumed to use the n-bit key KH and can be realized by polynomial computation over a finite field $GF(2^n)$ having KH as a variable and $r\_1, \ldots, r\_\{m-1\}$ as a coefficient.

As a concrete example, Expression 2 is shown. mul(a, b) in Expression 2 denotes the product of a and b over the finite field, and $KH^{\{i\}}$ denotes KH exponentiated by i over the finite field. An algorithm that computes a product over a finite field at high speed is for instance described in Non-Patent Document 9 [BIB-POLY].

The algorithm that computes a product over a finite field at high speed described in the above-mentioned Non-Patent Document 9 is incorporated herein by reference thereto.

$$H1[KH](\text{right}(x))=\text{mul}(r\_\{m-1\},KH^{\{m-1\}})+\text{mul}(r\_\{m-2\},KH^{\{m-2\}})+\ldots+\text{mul}(r\_\{1\},KH) \quad [\text{EXPRESSION 2}]$$

Further, when s is not an integer multiple of n, arbitrary padding is performed so that the length becomes an integer multiple of n and it may be inputted into Expression 2 above.

The key KH of the first hash means 102 may be an independent random number, but a tweakable block cipher may be used as well. In this case, an arbitrary constant is encrypted with a tweak value kv (the fixed tweak value, which is a reserved word) that the plaintext input means 101 does not always generate, and the key can be generated from the obtained ciphertext.

The unit block tweakable encryption means 103 generates a YA block (a third block), which is a ciphertext by means of cipher E of the XA block (the first block), using the tweak value tw outputted from the plaintext input means 101. More concretely, when the tweakable block cipher is TWB and its key is KB, the result of encrypting a plaintext x with the tweak value tw is expressed as follows: ciphertext y=TWB[KB](tw, x). Therefore, the YA block is expressed as follows: TWB [KB] (tw, XA block).

The tweakable block cipher mentioned above can be realized by having a block cipher secure against any chosen-ciphertext attack such as AES described in Non-Patent Document 10 [BIB-AES] or a serial concatenation of them operate in the cipher operation modes described in Non-Patent Document 4 [BIB-LRW] and Non-Patent Document 5 [BIB-XEX]. As described above, the cipher operation modes described in Non-Patent Document 4 [BIB-LRW] and Non-Patent Document 5 [BIB-XEX] convert an n-bit block cipher that is not tweakable, but is secure against any chosen-ciphertext attack into an n-bit tweakable block cipher secure against any chosen-ciphertext attack.

The block cipher secure against any chosen-ciphertext attack such as AES described in the above-mentioned Non-Patent Document 10 and each of the cipher operation modes described in the above-mentioned Non-Patent Documents 4 and 5 are incorporated herein by reference thereto.

The pseudorandom number generating means 104 (second encryption processing means) receives the sum of the XA block (the first block) and the YA block (the third block) or the result of an arbitrary group computation as input, and generates an (s-n)-bit Z block (a random number block). The pseudorandom number generating means 104 is required to be secure at least against known-plaintext attack. "Secure against known-plaintext attack" means that, when an attacker obtains the Z block while randomly supplying inputs (for instance the sum of the XA block and the YA block), it suffices to obtain the fact that it is difficult to distinguish between the Z block and true random numbers.

A key used by the pseudorandom number generating means 104 must be independent from a key used by the unit block tweakable encryption means 103. In general, the output length of a pseudorandom generator is much longer than the input length of n, however, a block cipher E' secure against any chosen-plaintext attack or chosen-ciphertext attack can be used in the aforementioned processing of the pseudorandom number generating means 104 as well. When the input is x (the sum of the XA block and the YA block, or a result of a group computation), the output of the pseudorandom number generating means 104 is expressed by the following Expression 3.

$$E'[KB'](c(1)+x),E'[KB'](c(2)+x),\ldots,E'[KB'](c(s/n)+x) \quad [\text{EXPRESSION 3}]$$

KB' in Expression 3 above is the key of the block cipher E'. Further, when the unit block tweakable encryption means 103 uses the key KB, KB' must be independent from KB. For instance, in case where the unit block tweakable encryption means 103 realizes the n-bit block cipher E that is not tweakable by converting it into a tweakable cipher in the cipher operation mode described in Non-Patent Document 4 [BIB-LRW] and Non-Patent Document 5 [BIB-XEX], the block cipher E' and the block cipher E may be the same block cipher algorithm or different algorithms. Note that the key KB' must be independent from the key KB even in this case.

Further, $c(i)$ in Expression 3 denotes fixed n-bit values different from each other, and + denotes exclusive OR. Further, when s/n is not an integer, the first (s-n) bits can be taken from (E'[KB'](c(1)+x), E'[KB'](c(2)+x), ..., E'[KB'](c(ceil)+x)) where ceil is the smallest integer greater than s/n.

Expression 3 above is called the counter mode of the block cipher E'. Further, the following Expression 4 may be outputted using OFB mode (output feedback mode).

$$(E'[KB'](x), E'[KB'](E'[KB'](x)), \ldots, E'[KB'](E'[KB'](\ldots E'[KB'](E'[KB'](x))\ldots)))$$ [EXPRESSION 4]

The second hash means 105 outputs a CA block (a fifth block) and a CB block (a sixth block) from the YA block (the third block), a Z block and an XB block, or a YB block (a fourth block) obtained from an arbitrary group computation. The second hash means 105 may be the same function as the first hash means 102, and the key may be an independent random number, or the same value used by the first hash means 102.

The ciphertext output means 106 concatenates the ciphertexts (the CA block and the CB block) outputted from the second hash means 105, and outputs the result as a ciphertext. More concretely, the ciphertext output means 106 can be constituted by a display device or printer of a computer that executes a block encryption method relating the present invention.

Next, the operation of the common key block encryption device relating to the first exemplary embodiment will be described with reference to the drawings.

Figure 2:
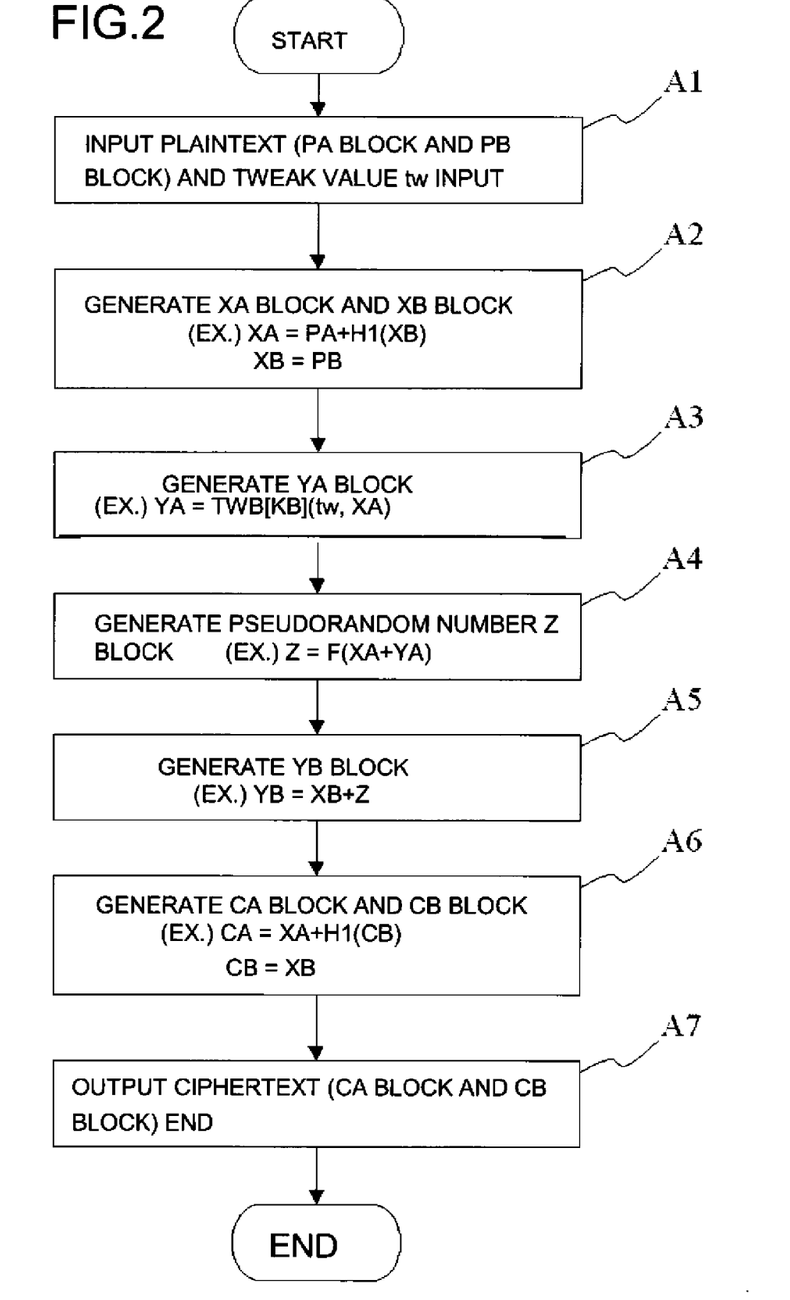
FIG. 2 is a flowchart showing the process flow of the common key block encryption device relating to the first exemplary embodiment of the present invention.

FIG. 2 is a flowchart showing the process flow of the common key block encryption device relating to the first exemplary embodiment of the present invention. In FIG. 2, first, the plaintext input means 101 receives an input of the tweak value tw and a plaintext (the PA block and the PB block) (step A1).

Next, the first hash means 102 divides the plaintext inputted by the plaintext input means 101 into the PA block and the PB block, and generates the XA block and the XB block using, for instance, Expression 1 (step A2).

Next, the unit block tweakable encryption means 103 encrypts the XA block by means of the tweakable block cipher with the tweak value tw and the key KH, and generates the YA block (step A3).

Next, the pseudorandom number generating means 104 generates the Z block from the sum of the XA block derived in step A2 and the YA block derived in step A3, or the result of an arbitrary group computation (step A4).

Next, by adding the Z block derived in step A4 and the XB block derived in step A2, the YB block is generated (step A5), and then the second hash means 105 generates a ciphertext (the CA block and the CB block) from the YB block and the YA block derived in the step A3, using, for instance, Expression 1 (step A6).

Finally, the ciphertext output means 106 outputs the ciphertext (the CA block and the CB block) (step A7).

As described above, by calling the tweakable block cipher only once (disregarding the preprocessing), an s-bit ciphertext (s bit being larger than the n bit) secure against any chosen-ciphertext attack can be obtained. Further, in the configuration of the exemplary embodiment described above, any size equal to or larger than the n bit can be the target block size, and high versatility can be achieved.

Further, as described in the exemplary embodiment above, the present invention can be constituted by single block cipher E alone. In this case, cipher F can be realized in a mode such as the counter mode or the OFB mode of the cipher E in which security against known-plaintext attacks is guaranteed (based on the cipher E's security against chosen-ciphertext attacks). (Note that an independent key KE' is used.) Further, at this time, the target block size is nm bit block, and the number of calls to the cipher E, disregarding the preprocessing, is 1 (cipher E)+(m−1)(cipher E')=m. When an attacker performs chosen-ciphertext attack q number of times, the security indicator (called "advantage;" the smaller the advantage, the higher the security gets) in the counter mode or the OFB mode of the block cipher using the independent key KE' is approximately $(mq)^2/2^n$. This means that, if $(mq)^2$ is sufficiently smaller than $2^n$, the probability of any successful chosen-ciphertext attack is negligible.

Meanwhile, the number of calls to the cipher E when HCTR described in Non-Patent Document 6 [BIB-HCTR] is constituted by single block cipher E alone is the same as above, m, however, the security indicator of HCTR is approximately $(mq)^3/2^n(mq)$, and this value is greatly larger (the security level is lower) than the security indicator $(mq)^2/2^n$ of the present invention. This is because a component in HCTR that corresponds to the cipher F in the present invention is constituted by the counter mode of a block cipher using the same key as the cipher E does.

Further, in HCH described in Non-Patent Document 7 [BIB-HCH], similar to HCTR described above, by using block cipher E that is not tweakable in the modified counter mode described in Non-Patent Document 11 [BIB-GIL] instead of the counter mode, the security becomes approximately $(mq)^2/2^n$ (when s=nm). It should be noted that, since an input to the counter mode is encrypted first in the modified counter mode of HCH, an extra call to the cipher E is always needed, and therefore the number of calls to the cipher E is m+1.

As described, even when only single block cipher E is used, the security of $(mq)^2/2^n$ and m number of calls to the cipher E (disregarding the preprocessing) can be achieved simultaneously in the present invention, and this is an advantage that neither HCTR of Non-Patent Document 6 [BIB-HCTR] nor HCH of Non-Patent Document 7 [BIB-HCH] is able to achieve. This advantage is mainly due to the fact that the keys used by the unit block tweakable encryption means 103 and the pseudorandom number generating means 104 are independent from each other.

Exemplary Embodiment 2

Figure 3:
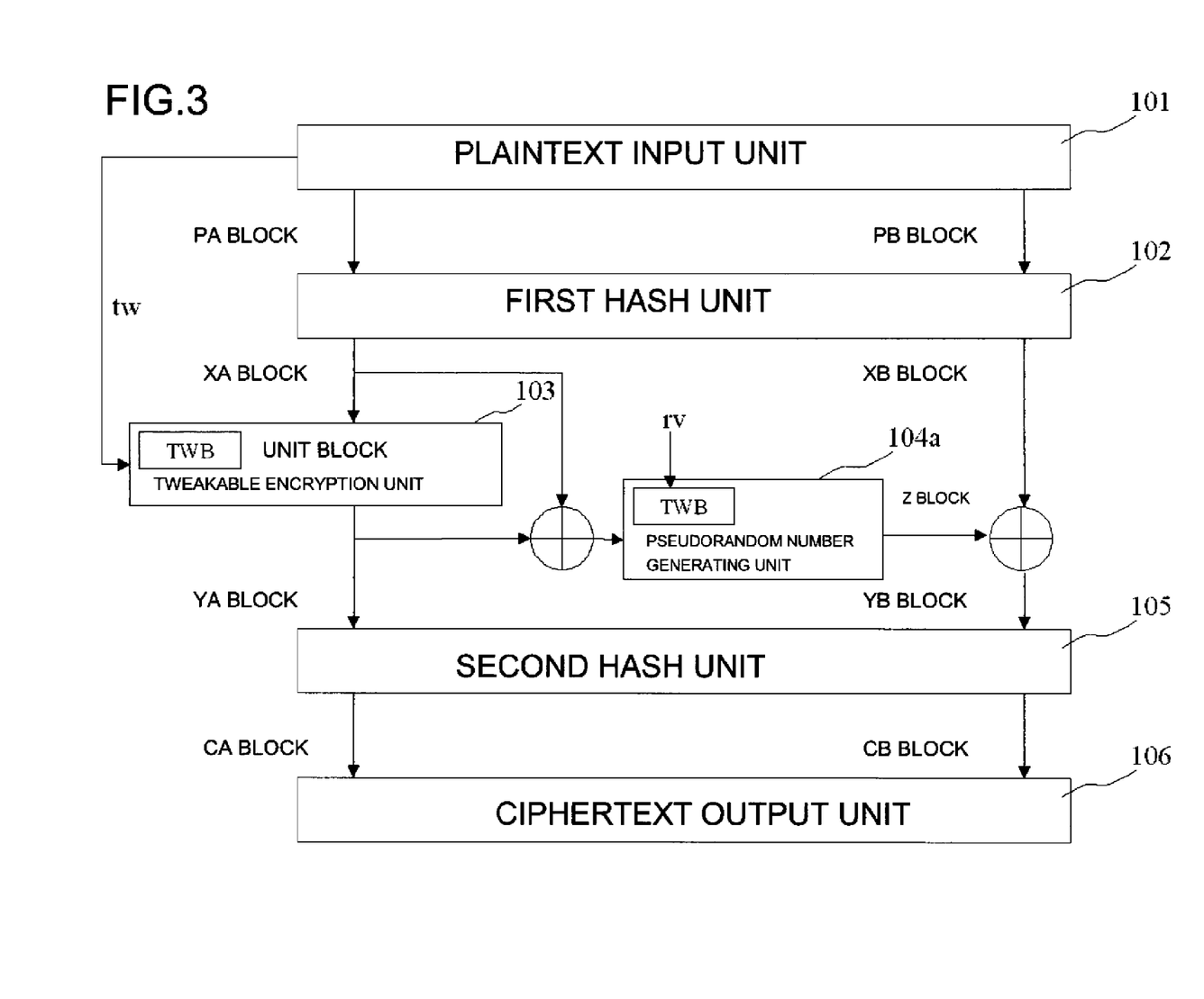
FIG. 3 is a block diagram showing the configuration of a common key block encryption device relating to a second exemplary embodiment of the present invention.

Next, a second exemplary embodiment of the present invention, in which the pseudorandom number generating means 104 of the first exemplary embodiment is modified, will be described. FIG. 3 is a block diagram showing the configuration of a common key block encryption device relating to the second exemplary embodiment of the present invention. In FIG. 3, the common key block encryption device relating to the second exemplary embodiment of the present invention comprises the plaintext input means 101, the first hash means 102, the unit block tweakable encryption means 103, pseudorandom number generating means 104a, the second hash means 105, and the ciphertext output means 106.

Since each of the plaintext input means 101, the first hash means 102, the unit block tweakable encryption means 103, the second hash means 105, and the ciphertext output means 106 in FIG. 3 is identical to the respective means in the first exemplary embodiment, the explanations of them will be omitted, and how the pseudorandom number Z block is generated by the pseudorandom number generating means 104a will be described in detail below.

The pseudorandom number generating means 104a (the second encryption processing means) receives the sum of the XA block and the YA block or the result of an arbitrary group computation as input, and generates the pseudorandom number Z block. As mentioned above, the pseudorandom number generating means 104a is required to be secure against any known-plaintext attack. In other words, when an attacker obtains the Z block while randomly supplying inputs (for instance the sum of the XA block and the YA block), it is sufficient to obtain the fact that it is difficult to distinguish between the Z block and true random numbers.

In the present exemplary embodiment, the tweakable block cipher TWB secure against any chosen-ciphertext attack is used as a random number generator. When the key of TWB is KB and a ciphertext obtained by encrypting a message x with a tweak value tw is y=TWB [KB] (tw, x), for instance, the output of the pseudorandom number generating means 104a is expressed by the following Expression 5. Further, the input x in Expression 5 is the sum of the XA block and the YA block, or the result of a group computation.

$$TKB[KB](rv,c(1)+x), TWB[KB](rv,c(2)+x), \ldots, TWB[KB](rv,c(s/n)+x) \quad \text{[EXPRESSION 5]}$$

Expression 5 above corresponds to the counter mode of the block cipher E' in the first exemplary embodiment. Similarly, the pseudorandom number generating means 104a may output the following Expression 6 that corresponds to the OFB mode of the block cipher E' in the first exemplary embodiment.

$$(TWB[KB](rv,x), TWB[KB](rv, TWB[KB](rv,x)), \ldots, TWB[KB](TWB[KB](\ldots TWB[KB](TWB[KB](x))\ldots)) \quad \text{[EXPRESSION 6]}$$

rv in Expressions 5 and 6 is a unique tweak value that the plaintext input means 101 does not output as a tweak value always. Further, when the key of the first hash means 102 is generated from the result of encrypting a constant with the tweakable block cipher TWB using the KB and the tweak value kv, rv is different from kv, too.

Further, in Expressions 5 and 6, s/n is assumed to be an integer, however, when s/n is not an integer, the first (s-n) bits can be taken from the following Expression 7 after Expression 5 is rewritten into Expression 7, where ceil is the smallest integer greater than s/n. Expression 6 can be rewritten similarly.

$$TKB[KB](rv,c(1)+x), TWB[KB](rv,c(2)+x), \ldots, TWB[KB](rv,c(\text{ceil})+x) \quad \text{[EXPRESSION 7]}$$

As described above, the pseudorandom number generating means can be constituted by the tweakable block cipher TWB operating with the unique tweak value rv while having the same key KB. Further, since the present exemplary embodiment is configured so that sets of the tweak values do not overlap, the security indicator of $(mq)^2/2^n$ (mq)) and m number of calls to the cipher E are achieved as in the first exemplary embodiment.

Exemplary Embodiment 3

Next, a third exemplary embodiment of the present invention using a stream cipher as the pseudorandom number generating means of the first exemplary embodiment above will be described. Since each constituent of the present exemplary embodiment is identical to each means of the first exemplary embodiment except for the pseudorandom number generating means, the explanations of them will be omitted, and how the pseudorandom number Z block is generated by the pseudorandom number generating means will be described in detail below.

The pseudorandom number generating means (the second encryption processing means) (104 in FIG. 1) in the present exemplary embodiment receives the sum of the XA block and the YA block or the result of an arbitrary group computation as input, and generates the pseudorandom number Z block, using a stream cipher. More concretely, the pseudorandom number generating means (104 in FIG. 1) is required to be an additive stream cipher accepting an n-bit IV and secure against any known-IV attack. For instance, the pseudorandom number generating means (104 in FIG. 1) can be realized by the stream cipher SEAL described in Non-Patent Document 12 [BIB-SEAL].

Further, when the unit block tweakable encryption means (103 in FIG. 1) uses AES described in Non-Patent Document 10, the stream cipher LEX described in Non-Patent Document 13 [BIB-LEX] can also be used as the stream cipher. In this case, there is an advantage that the cost for newly implementing a stream cipher in addition to AES is essentially eliminated.

The key of the stream cipher can be an independent random number, or it may be generated from (TWB[KB](rv, c1), TWB[KB](rv, c2), . . . , TWB[KB](rv, cs)) where TWB is the tweakable block cipher used by the unit block tweakable encryption means (103 in FIG. 1) and KB is its key. Here, $c_1, \ldots, c_s$ are s number of n-bit constants different from each other, and rv is a tweak value that the plaintext input means (101 in FIG. 1) does not output always and that corresponds to rv in the second exemplary embodiment. Note that, in the case where the key KH of the first hash means (102 in FIG. 1) is generated from the results obtained by encrypting w number of constants d1, d2, . . . , dw with the fixed tweak value kv of TWB (in other words, KH is generated from (TWB[KB](kv, d1), TWB[KB](kv, d2), . . . , TWB[KB](kv, dw))), rv must be different from kv, or (s+w) number of constants c1, c2, . . . , cs, d1, d2, . . . , dw must be different from each other when rv is equal to kv.

As described above, the pseudorandom number generating means may also be constituted by a stream cipher secure against any known-IV attack.

The preferred exemplary embodiments of the present invention are described above, however, the present invention is not limited to the exemplary embodiments discussed, and further modifications, substitutions, and adjustments can be taken without departing from the fundamental technical concepts of the present invention.

For instance, the pseudorandom number generating means (104 in FIG. 1) may also be realized from a function (for instance a block cipher secure against any known plaintext attack), having a short fixed output length of, secure against any known-plaintext attack by utilizing the ICT mode described in Non-Patent Document 3 [BIB-ICT].

INDUSTRIAL APPLICABILITY

The present invention can be applied to use such as a system in which two parties perform encrypted communication, a system that safely delivers contents such as movies and music, and file cipher for safely operating data on a computer server.

Although the above description is made based on the exemplary embodiments, the present invention is not limited thereto.

It should be noted that modifications/adjustments may be done based on the basic technical concept of the present invention. Also it should be noted that any combination of the disclosed and/or claimed elements, matters and/or items may fall under the modifications aforementioned.

Still further problems and object(s) as well as the developing mode(s) will become apparent from the entire disclosure, including the claims of the present invention.

The invention claimed is:

1. A common key block encryption device, comprising:
   a first hash unit that applies locked key permutation to a plaintext of a variable-length of s bit, and outputs a first block of a fixed-length of n bit and a second block of (s-n) bit;
   a first encryption processing unit that outputs a third block encrypted by means of n-bit block tweakable block cipher using tweak, receiving said first block as input;
   a second encryption processing unit that generates a random number block of (s-n) bit with a result of group computation of said third block and said first block as input by using an arbitrary cipher having theoretical security at least against a known-plaintext attack;
   a second hash unit that applies the locked key permutation to the result of the group computation of said random number block and said second block, and to said third block to output a fifth block of n bit and a sixth block of (s-n) bit; and
   an output unit outputs an s-bit encryption by concatenating said fifth and sixth blocks;
   wherein the length of n bit is selected such that the number of calls of the ciphers is m and a security indicator is calculated to be $(mq)^2/2^n$ where q is a number of times an attacker performs a chosen-ciphertext attack.

2. The common key block encryption device as defined in claim 1, wherein said second encryption processing unit is constituted by n-bit block cipher that operates in a counter mode using an independent key different from a key used for an output of said third block, and generates a random number block.

3. The common key block encryption device as defined in claim 1, wherein said second encryption processing unit is constituted by an n-bit block cipher that operates in an output feedback (OFB) mode using an independent key different from a key used for an output of said third block, and generates a random number block.

4. The common key block encryption device as defined in claim 1, wherein said second encryption processing unit generates a random number block using said n-bit block tweakable block cipher for which a fixed tweak value rv different from a tweak value tw used for an output of said third block is set.

5. The common key block encryption device as defined in claim 4, wherein said second encryption processing unit generates said random number block by having n-bit block cipher operate in a cipher operation mode that converts the n-bit block cipher into a tweakable cipher.

6. The common key block encryption device as defined in claim 4, wherein said second encryption processing unit generates said random number block by having n-bit block tweakable block cipher operate in a counter mode with said fixed tweak value rv.

7. The common key block encryption device as defined in claim 4, wherein said second encryption processing unit generates said random number block by having said n-bit block tweakable block cipher operate in an output feedback (OFB) mode with said fixed tweak value rv.

8. The common key block encryption device as defined in claim 1, wherein said second encryption processing unit generates an (s-n)-bit random number block using an additive stream encryption that receives a result of the group computation of said first and third blocks as an initial vector, and outputs an (s-n)-bit key stream.

9. The common key block encryption device as defined in claim 8, wherein a key of said additive stream encryption is generated using an n-bit block tweakable block cipher that uses a fixed tweak value rv different from a tweak value tw used for the output of said third block.

10. The common key block encryption device as defined in claim 9, wherein the key of said additive stream encryption is generated by having an n-bit block cipher operate in a cipher operation mode that convert the n-bit block cipher into tweakable cipher.

11. The common key block encryption device as defined in claim 1, wherein said first encryption processing unit generates said third block by having n-bit block cipher operate in a cipher operation mode that converts the n-bit block cipher into a tweakable cipher.

12. The common key block encryption device as defined in claim 1, wherein
   said first hash unit regards (s-n) bits of the s-bit plaintext as said second block and outputs a sum of a result obtained by compressing said second block using a hash function and an n-bit block out of the s-bit ciphertext as the first block; and
   said second hash unit regards a sum of the result obtained by compressing a fourth block using a hash function and said third block as a CA block, and outputs said fourth block as a CB block.

13. The common key block encryption device as defined in claim 12, wherein a polynomial hash function over a finite field $GF(2^n)$ having an n-bit secret key as a variable is used as said hash function, and said first and second hash units adjust the length of input to an integer multiple of n by means of padding, and receives the result as input.

14. The common key block encryption device as defined in claim 1, wherein a tweak value used in said first encryption processing unit is fixed.

15. The common key block encryption device as defined in claim 1, wherein a first key used by the first encryption processing unit is independent from a second key used by the second encryption processing unit.

16. The common key block encryption device as defined in claim 1,
   wherein a first key used for the n-bit block tweakable block cipher is independent from a second key used for the arbitrary cipher having theoretical security at least against a known-plaintext attack, and
   wherein the arbitrary cipher having theoretical security at least against a known-plaintext attack is an output feedback mode of the n-bit block tweakable block cipher.

17. A common key block encryption method, comprising:
   when data is encrypted and written to storage, applying locked key permutation to a plaintext of a variable-length of s bit, and outputting a first block of a fixed-length of n bit and a second block of an (s-n) bit;
   outputting a third block encrypted by means of n-bit block tweakable block cipher using tweak, receiving said first block as input;
   generating a random number block of (s-n) bit, receiving result of group computation of said third block and said first block as input by using an arbitrary cipher having theoretical security at least against a known-plaintext attack;
   applying locked key permutation to the result of the group computation of said random number block and said second block, and to said third block, and outputting a fifth block of n bit and a sixth block of (s-n) bit; and concatenating said fifth and sixth blocks to form an s-bit ciphertext, and writing the s-bit ciphertext to said storage, wherein the length of n bit is selected such that a security indicator for a chosen-cipher attack, where the number of calls of the n-bit block tweakable block cipher and the arbitrary cipher is m and a number of times an attacker performs the chosen-ciphertext attack is q, is $(mq)^2/2^n$.

18. The common key block encryption method as defined in claim 17, wherein a first key used for the n-bit block tweakable block cipher is independent from a second key used for the arbitrary cipher having theoretical security at least against a known-plaintext attack.

19. A non-transitory computer-readable storage medium storing a program for encrypting data and writing the result to storage, the program configured to cause a processing unit of a computer execute the steps of:

encrypting by means of n-bit block tweakable block cipher using tweak, receiving a first block of an n bit obtained from a bit sequence obtained by applying locked key s-bit permutation to a plaintext of an s bit as input;

applying locked key permutation to a plaintext of a variable-length of s bit, and outputting a first block of a fixed-length of n bit and a second block of (s-n) bit;

outputting a third block encrypted by means of n-bit block tweakable block cipher using tweak, receiving said first block as input;

generating a random number block of (s-n) bit with the result of group computation of said third block and said first block as input by using an arbitrary cipher having theoretical security at least against a known-plaintext attack;

applying the locked key permutation to the result of the group computation of said random number block and said second block, and to said third block, and outputting a fifth block of n bit and a sixth block of (s-n) bit; and outputting an s-bit encryption by concatenating said fifth and sixth blocks, and writing the s-bit encryption to said storage, wherein the length of n bit is selected such that a security indicator for a chosen-cipher attack, where the number of calls of the n-bit block tweakable block cipher and the arbitrary cipher is m and a number of times an attacker performs the chosen-ciphertext attack is q, is $(mq)^2/2^n$.

20. The common key block encryption method as defined in claim 19, wherein a first key used for the n-bit block tweakable block cipher is independent from a second key used for the arbitrary cipher having theoretical security at least against a known-plaintext attack.

21. The common key block encryption method as defined in claim 17, wherein a first key used for the n-bit block tweakable block cipher is independent from a second key used for the arbitrary cipher having theoretical security at least against a known-plaintext attack, and wherein the arbitrary cipher having theoretical security at least against a known-plaintext attack is an output feedback mode of the n-bit block tweakable block cipher.

* * * * *

UNITED STATES PATENT AND TRADEMARK OFFICE
CERTIFICATE OF CORRECTION

PATENT NO.       : 8,577,032 B2
APPLICATION NO.  : 12/672346
DATED            : November 5, 2013
INVENTOR(S)      : Kazuhiko Minematsu Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 561 days.

Signed and Sealed this
Twenty-second Day of September, 2015

Michelle K. Lee
*Director of the United States Patent and Trademark Office*